Figure 1:
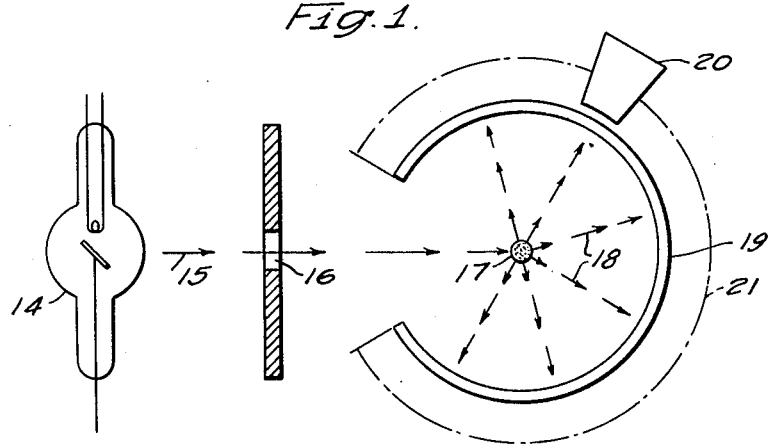

Jan. 23, 1951     FITZ-HUGH B. MARSHALL     2,539,196
RADIATION DETECTOR

Filed July 22, 1948

WITNESSES:

INVENTOR
Fitz-Hugh B. Marshall.
BY
ATTORNEY

Patented Jan. 23, 1951

2,539,196

UNITED STATES PATENT OFFICE 2,539,196

RADIATION DETECTOR

Fitz-Hugh B. Marshall, Glenshaw, Pa., assignor to Westinghouse Electric Corporation, East Pittsburgh, Pa., a corporation of Pennsylvania Application July 22, 1948, Serial No. 40,086

12 Claims. (Cl. 250—65)

My invention relates to radiant energy measuring devices and in particular to a scanning device that measures radiation intensity along an arc or over an area.

One object of my invention is the determination of radiation intensity variations as a function of position along a line.

Another object of my invention is to determine the radiation intensity pattern as a function of position over a surface.

A further object of my invention is to measure spectral patterns for X-ray spectrographic purposes or for spectrographic purposes involving other radiations.

Figure 2:
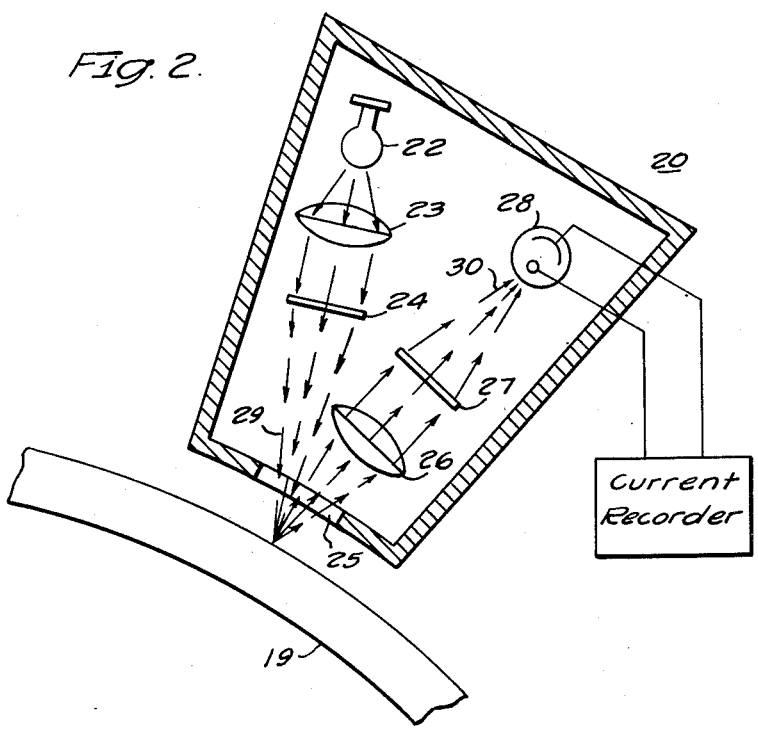

Other objects of my invention will become apparent upon reading the following description of one illustrative embodiment of its principles taken in connection with the drawing, in which:

Figure 1 is a schematic diagram showing the general arrangement of an apparatus utilizing my invention; and Fig. 2 is a more detailed showing also largely diagrammatic, of one form of apparatus embodying its principles.

Certain terms used in the following description of the drawing will first be defined as follows:

a. *Exciting radiation.*—Radiant energy that reacts with a phosphor to produce light, e. g., X-rays, gamma rays, alpha rays, beta rays, high-speed electron beams, high-speed ion beams, and ultra-violet radiation. This group also includes neutrons, provided that the phosphor is impregnated with a material such as a compound of boron that will emit alpha particles as the result of interaction with neutrons. Dr. Kuan-Han Sun's application, Serial No. 755,636, filed June 19, 1947, now Patent 2,534,932, for a Method of Detecting Elementary Particles, shows and claims details of a neutron detection arrangement. The term "exciting radiation" may even include visible light of wavelength shorter than the light emitted by the phosphor.

b. *Stimulating radiation.*—Radiant energy that expedites the release of light from a phophor, i. e., infra-red radiation or other wavelengths which will expedite release of light and which can be separated from the light by optical filters or other comparable means. Heat (even when not transmitted as radiant energy) is an alternative method of stimulation, and this is meant to be implied in this disclosure whenever "stimulating radiation" is referred to.

c. *Light (from phosphor).*—Radiant energy emitted by a phosphor after excitation, i. e., visible light or light of wavelengths (visible or invisible) to which the light detector is sensitive.

d. *Phosphor.*—A phosphorescent material. One that will emit light as a result of irradiation by an exciting radiation.

e. *Ideal phosphor.*—A phosphorescent material with the following characteristics, or one exhibiting these characteristics to some degree:

1. Has a high energy efficiency for the ultimate conversion of exciting radiation into light.
2. Stores energy indefinitely until stimulated by stimulating radiation.
3. Capable of storing a large amount of energy.
4. Releases energy rapidly as light when stimulated by stimulating radiation.

Most present commercial phosphors, i. e., cadmium-zinc sulphide and zinc sulphide, are specially treated to reduce their ability to store energy. Therefore, without this "special treatment," or with treatment to obtain a diametrically opposite effect, the long persistency required in my arrangement will be obtained. One form of the above-mentioned special treatment, applicable to zinc sulphide, is activation by copper and/or lead. Another suitable phosphor is strontium selenide activated with samarium and europium. (Many other examples are listed in a series of papers and articles in the Journal of the Optical Society of America 36, 351–353, 369–389 (1946).)

Referring now to the detailed description of one form of my invention as shown in Fig. 1, X-rays 15 are emitted from source 14, pass through slit 16, and strike the substance of which it is desired to obtain the X-ray diffraction pattern, which may be in the form of a powder 17. The diffracted X-rays 18 from the powder strike ideal phosphor 19, which tends to store energy of the diffracted X-rays incident upon it until this energy is released as light by some agency. This agency may in accordance with my invention comprise a stimulating radiation that is emitted from a source within detector box 20 which is arranged to travel along arc 21. The light released is measured by detection means also contained in detector box 20 as shown and described in conjunction with Fig. 2.

Figure 2 shows a detailed view of detector box 20. Stimulating radiation 29 is emitted from source 22, focused by lens 23, passes through filter 24, is directed through narrow slit 25, and strikes ideal phosphor 19. Light 30 is emitted from ideal phosphor 19 when it is struck by stimulating radiation 29. This light passes through slit 25, is focused by lens 26, passes through filter 27, and is finally detected by phototube 28, which may be a multiplier phototube. The output of the phototube is then fed directly or through an amplifier to an indicator such as a meter, a recording meter, or an oscilloscope.

It will be clear that if the depth of the aperture 25 normal to the plane of Fig. 2 is sufficiently small the radiation storage in a correspondingly narrow path along phosphor 19 will be recorded; and if before each scanning motion the detector box 20 is displaced slightly relative to the phosphor 19 in a direction normal to the plane of the paper in Fig. 2 successive contiguous narrow paths on the phosphor 19 may be scanned in a manner analogous to the scanning of television images. Thus a pattern representing a two dimensional variation in distribution of radiation may readily be recorded.

It is obvious that in my device all the diffracted radiation from the powder tends to be collected in the phosphor 19 and that when desirable the period during which energy is thus stored may continue for an extended period of time. Thus a pattern of very substantial energy value may result by gradual accretion of a relatively weak radiation; and this stored pattern may be discharged at a desirably rapid rate to produce easily amplified records. The indicator may also be a simple indicating or graphically recording instrument not subject to the delays inherent in photographic processing. The spectral response pattern may be quickly recorded automatically for analysis or permanent record. As an alternative, when a high radiation intensity is available and the time for sweeping over the pattern is short, the pattern may be continuously scanned on an oscilloscope, the oscilloscope sweep being synchronized with the motion of the detector box along the arc, the latter motion being made repetitive if desired. In this way transient changes in the pattern may be conveniently observed as they occur.

X-ray diffraction work has been used by way of example for the purpose of simplifying the explanation of the method of this invention. The invention has much broader application. First, it is applicable to a large number of spectrometry cases. It is not confined to X-rays; any exciting radiation, as defined at the beginning of this disclosure, may be used. Each radiation must be diffracted or dispersed by a mechanism suitable to it, whether an optical prism, optical grating, or atomic crystal lattice. The light emitted by the phosphor and the stimulating radiation are meant in the broader sense indicated at the beginning of the disclosure. The spectrometric purpose to which the method is applied may be analysis of the study of the diffracting or dispersing mechanism (e. g., crystal analysis) or study of the characteristics of the exciting radiation. Since the tremendous scope of pertinent spectrographic applications would require many lengthy treatises to cover adequately, it is not possible to itemize all possible applications here.

Further my invention covers in general the use of the method described for the general purpose of scanning intensity variations of the exciting radiation along a curve or other linear distribution without reference to spectrographic work or over a surface. Thus the method might be used to measure variation in absorption of radiation along a strip of absorbing material having variations in some characteristic like thickness, or it might be used to scan two-dimensionally over an area to obtain a picture of the object by the transmitted exciting radiation, comparable to a radiograph.

I claim as my invention:

1. In combination with means for producing an exciting radiation distributed with varying intensity over an area normal to the direction of propagation thereof, a substance having the property of storing energy with a distribution corresponding point-by-point with the intensity of radiation incident thereon and of reradiating said energy under incidence of a stimulating radiation, said substance being interposed in the path of said exciting radiation, means for scanning said substance point-by-point with a narrow beam of said stimulating radiation and recording means producing an electric current corresponding to the intensity of said reradiated energy positioned to be energized thereby.

2. In combination with means for producing an X-ray pattern of a specimen, a plate comprising a phosphor interposed in the path of the radiation constituting said pattern, means for scanning said phosphor with radiation capable of accelerating the release of energy stored in said phosphor by said pattern said stimulating radiation being incident on only a confined area of said phosphor at any one time, means for scanning said phosphor with said confined area, and means for producing an electric current proportional to the instantaneous value of said released energy and positioned to be energized thereby.

3. In combination with means for producing an X-ray pattern of a specimen, a plate comprising cadmium-zinc sulphide interposed in the path of the radiation constituting said pattern, means for scanning said plate with radiation capable of accelerating the release of energy stored in said cadmium-zinc sulphide by said pattern, said stimulating radiation being incident on only a confined area of said plate at any one time, means for scanning said plate with said confined area, and means for producing an electric current proportional to the instantaneous value of said released energy and positioned to be energized thereby.

4. In combination with means for producing a radiation pattern of a specimen, a plate comprising a phosphor interposed in the path of the radiation constituting said pattern, means for scanning said plate with infra-red radiation capable of accelerating the release of energy stored in said phosphor by said pattern, said infra-red radiation being incident on only a confined area of said plate at any one time, means for scanning said plate with said confined area, and means for producing an electric current proportional to the instantaneous value of said released energy and positioned to be energized thereby.

5. In combination with means for producing a radiation pattern of a specimen, a phosphor plate interposed in the path of said pattern, means for scanning said plate with a narrow beam of stimulating radiation capable of accelerating the rate at which energy stored in said plate by said pattern is released to produce light proportional from instant to instant to the energy stored at the point of incident of said stimulating radiation on said plate, and a photoelectric device upon which said light is incident arranged to produce an output current.

6. In combination with means for producing a radiation pattern of a specimen, a phosphor plate interposed in the path of said pattern, means for scanning said plate with a narrow beam of stimulating radiation capable of accelerating the rate at which energy stored in said plate by said pattern is released to produce light proportional from instant to instant to the energy stored at the point of incidence of said stimulating radiation on said plate, a photoelectric device upon which said light is incident arranged to produce an output current, and means for recording the instantaneous values of said electric current while said scanning operation is in progress.

7. The method of recording the space distribution of a radiation pattern which comprises interposing in the path of said pattern a substance having the property of storing energy with a distribution corresponding point-by-point with the intensity of said pattern and of reradiating said energy under incidence of a stimulating radiation, scanning said substance point-by-point with a narrow beam of said stimulating radiation, interposing an energy-output device in the path of said reradiated energy, and recording the variations in said energy output while said scanning takes place.

8. The method of recording the space distribution of a radiation pattern which comprises interposing in the path of said pattern an ideal phosphor having the property of storing energy with a distribution corresponding point-by-point with the intensity of said pattern and of reradiating said energy under incidence of a stimulating radiation, scanning said substance point-by-point with a narrow beam of said stimulating radiation, interposing an energy-output device in the path of said reradiated energy, and recording the variations in said energy output while said scanning takes place.

9. The method of recording the space distribution of a radiation pattern which comprises interposing in the path of said pattern a substance having the property of storing energy with a distribution corresponding point-by-point with the intensity of said pattern and of reradiating said energy under incidence of a stimulating radiation, then scanning said substance point-by-point with a narrow beam of said stimulating radiation which has sufficient intensity to reradiating said energy more rapidly than it was stored, and interposing a device producing an electric current in the path of said reradiated energy.

10. In combination with means for producing an X-ray field which is distributed in space, a plate comprising a phosphor interposed in the path of said field, means for scanning said phosphor with a narrow beam of infra-red radiation, and means for producing an electric current proportional to the instantaneous value of the energy radiated by said phosphor at the point of incidence of said beam.

11. In combination with means for producing an X-ray pattern which is distributed in space, a plate comprising zinc sulphide interposed in the path of the radiation constituting said pattern, means for scanning said plate with a narrow beam of infra-red radiation, and means for producing an electric current responsive to the radiation from said plate at the point of incidence of said beam.

12. In combination with means for producing a radiation field which is distributed in space, a phosphor plate interposed in the path of said radiation field, means for scanning said plate with a narrow beam of infra-red radiation, and a photoelectric device responsive to the radiation from said plate at the point of incidence of said beam.

FITZ-HUGH B. MARSHALL.

REFERENCES CITED

The following references are of record in the file of this patent:

UNITED STATES PATENTS

| Number | Name | Date |
| --- | --- | --- |
| 1,648,058 | Parker | Nov. 8, 1927 |
| 1,961,713 | Simjian | June 5, 1934 |
| 2,074,226 | Kunz et al. | Mar. 16, 1937 |
| 2,203,352 | Goldmark | June 4, 1940 |
| 2,319,898 | Zurian | May 25, 1943 |
| 2,395,099 | Cage | Feb. 19, 1946 |

OTHER REFERENCES

Microsecond Measurement of the Phosphorescence of X-ray Fluorescent Screens by Fitz-Hugh Marshall, Journal of Applied Physics, June 1947, pp. 512–518. (Copy in Patent Office Library.)

A Comparison Between a Geiger-Mueller Counter, a Secondary Electron Multiplier Tube and Photographic Film for Detecting Weak X-rays by Eisenstein and Gingrich, Review of Scientific Instruments, Dec. 1941, pp. 582–586. (Copy in the Patent Office Library.)